United States Patent
Smith et al.

(10) Patent No.: US 6,459,832 B1
(45) Date of Patent: Oct. 1, 2002

(54) METHOD AND APPARATUS FOR OPTICAL SIGNAL TRANSMISSION USING MULTIPLE SUB-SIGNALS OF NON-UNIFORM BANDWIDTH

(75) Inventors: Peter J. Ashwood Smith, Hull (CA); Donald Fedyk, Groton, MA (US)

(73) Assignee: Nortel Networks Limited, St-Laurent (CA)

( * ) Notice: Subject to any disclaimer, the term of this patent is extended or adjusted under 35 U.S.C. 154(b) by 61 days.

(21) Appl. No.: 09/722,733

(22) Filed: Nov. 28, 2000

(51) Int. Cl.[7] .............................. G02B 6/26; H04B 10/04
(52) U.S. Cl. ................... 385/24; 385/1; 385/88; 385/92; 359/115; 359/124; 359/193; 359/188
(58) Field of Search .............................. 385/1, 2, 3, 24, 385/88, 92; 359/115, 124, 160, 349, 193, 188

(56) References Cited

U.S. PATENT DOCUMENTS

| | | | | | |
|---|---|---|---|---|---|
| 4,229,067 A | * | 10/1980 | Love | .......................... | 385/124 |
| 5,345,332 A | * | 9/1994 | daSilva et al. | ............... | 359/160 |
| 5,392,154 A | * | 2/1995 | Chang et al. | ................ | 359/124 |
| 5,479,447 A | * | 12/1995 | Chow et al. | ................ | 375/260 |
| 6,252,909 B1 | * | 6/2001 | Tzannes et al. | ............. | 329/357 |

* cited by examiner

Primary Examiner—Brian Healy

(57) ABSTRACT

An optical medium containing a transport signal that has a plurality of sub-signals, each sub-signal being characterized by a known wavelength of light and a known bandwidth, the bandwidth of the sub-signals being non-uniform. Optionally, the spacing between the sub-signals (spacing in the optical frequency domain) is non-uniform as well. The spacing between two adjacent sub-signals can be varied on the basis of the bandwidth of the sub-signals.

22 Claims, 2 Drawing Sheets

METHOD AND APPARATUS FOR OPTICAL SIGNAL TRANSMISSION USING MULTIPLE SUB-SIGNALS OF NON-UNIFORM BANDWIDTH

FIELD OF THE INVENTION

The present invention relates to the transmission of optical signals, in particular optical signals having sub-signals of non-uniform bandwidth.

BACKGROUND OF THE INVENTION

Optical transmission equipment in current use today supports a number of sub-signals, each of which has a known wavelength and a fixed bandwidth. For example, the transmission equipment may support 100 sub-signals, each sub-signal being OC-192 based. The number "100" of sub-signals mentioned here is an arbitrary number as it is technically possible to support more, closely spaced sub-signals of lower bandwidth, or less, widely spaced sub-signals of higher bandwidth.

In instances when a data signal must be transported by a sub-signal, the bandwidth of the data signal is usually significantly lower than the bandwidth of the sub-signal. In this instance, it is known to use a multiplexing mechanism such as a Time Division Multiplexing (TDM) mechanism to carry the data signal over the higher bandwidth pipe constituted by the sub-signal.

This approach presents two distinct drawbacks. First, the necessity to use a multiplexing mechanism makes the optical transmission system complex. Second, when the sub-signal is subdivided, the various parts that result from the division are all usable independently with the exception that such use is restricted over the entire length of the sub-signal path. For example, a second data signal can be multiplexed with the first data signal and both signals transported over the sub-signal at the condition that the first and second data signals follow exactly the same path through the optical transmission system. In practice, this is not always the case since the second data signal may follow a different route than the first data signal. Accordingly, the current approach lacks flexibility.

Against this background, it clearly appears that a need exists in the industry to develop a method and a system for optical transmission that resolves, or at least alleviates, some of the drawbacks associated with the current technology.

SUMMARY OF THE INVENTION

In a first broad aspect, the invention provides an optical medium containing a transport signal that has a plurality of sub-signals, each sub-signal being characterized by a known wavelength of light and a known bandwidth, the bandwidth of the sub-signals being non-uniform, in other words, at least one of the sub-signals has a bandwidth that is different from the bandwidth of another sub-signal.

This approach makes possible the use of sub-signals that are tailored, at least to some degree, to the bandwidth of the-data signals to be transported. As a consequence, the necessity to implement a multiplexing mechanism over one or more sub-signals is reduced, perhaps even eliminated.

Under a specific and non-limiting example of implementation, the invention provides an optical transmission system that comprises a transmitter element, an optical transmission medium such as an optical fiber and a receiver element. In addition to using sub-signals of non-uniform bandwidth, the sub-signals are also spaced in the optical frequency domain in a non-uniform manner. Under this example of implementation, the sub-signal spacing is related to the bandwidth of the sub-signals. For instance, sub-signals of relatively low bandwidth are spaced closer than signals of relatively high bandwidth. One advantage of this exemplary embodiment is the ability to increase the number of sub-signals in the transport signal. It follows that the number of different paths that can be established in the optical transmission system can also be increased in the interest of providing more flexible transport solutions.

Under a second broad aspect, the invention provides a transmitter element having an output for connection to an optical transmission medium, the transmitter element being operative to generate at the output an optical transport signal that has a plurality of sub-signals. Each sub-signal is characterized by a known wavelength of light and a known bandwidth where the bandwidth of the sub-signals is non-uniform.

Under a third broad aspect, the invention provides a receiver element having an input and an output, the input being suitable for connection to an optical transmission medium conveying an optical transport signal that has a plurality of sub-signals. Each sub-signal is characterized by a known wavelength of light and a known bandwidth where the bandwidth of the sub-signals being non-uniform. The receiver element is operative to generate at the output an electrical signal in dependence of at least one of the sub-signals in the optical transmission medium.

BRIEF DESCRIPTION OF THE DRAWINGS

A detailed description of examples of implementation of the present invention is provided hereinbelow with reference to the following drawings, in which.

Figure 1:
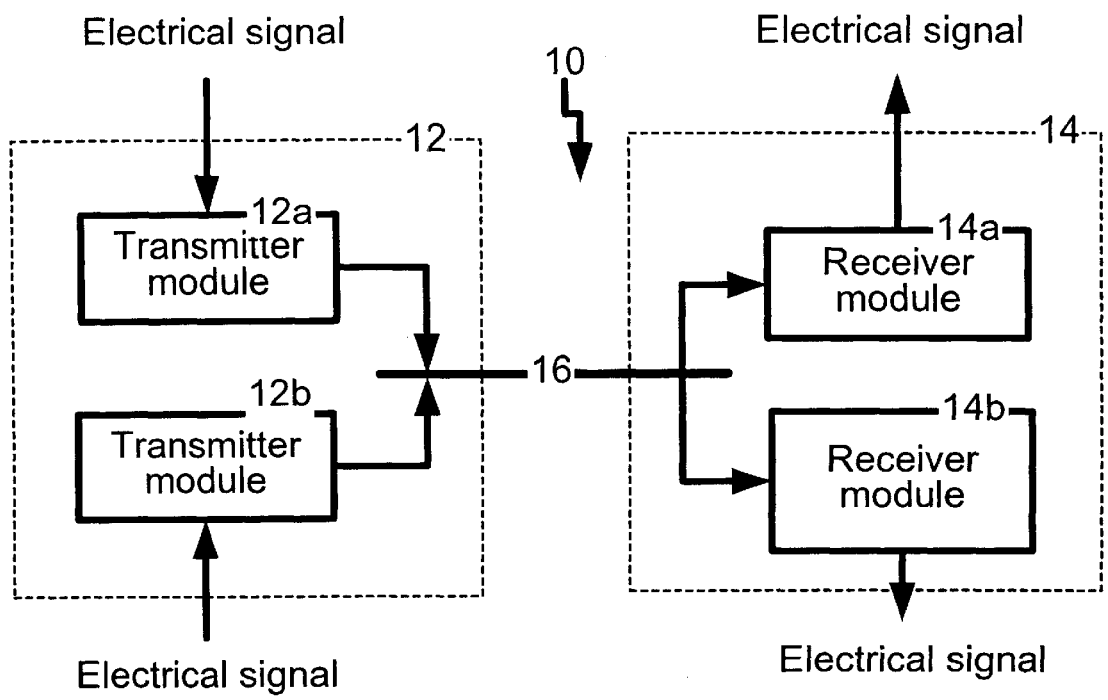
FIG. 1 is a block diagram of an optical transmission system.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates the general architecture of an optical transmission system. The optical transmission system, designated comprehensively by the reference numeral 10, includes three main components, namely a transmitter element 12, a receiver element 14 and an optical transmission medium 16 between the transmitter element 12 and the receiver element 14. The transmitter element 12 is comprised of a plurality of transmitter modules 12a, 12b, etc. Similarly, the receiver unit 14 is comprised of a plurality of receiver modules 14a, 14b, etc.

The number of transmitter modules and receiver modules in the transmitter element 12 and in the receiver element 14, respectively, is not critical to the present invention and the number of the transmitter modules and receiver modules can vary widely without departing from the general inventive concept.

A transmitter module 12a 12b is functionally associated with a companion receiver module 14a 14b. Each transmitter module receives an electrical signal to be transported over the optical medium 16, converts this signal in optical form and introduces it in the optical medium 16. The reverse operation takes place at the companion receiver module where the optical signal is processed to extract the corresponding electrical signal. The functional association between a transmitter module and a companion receiver module creates a signal propagation path where the transmitter module and the receiver module form the endpoints of that path. In particular, by taking as a reference the direction of signal flow, the transmitter unit will form the starting endpoint of the signal propagation path while the receiver unit will form the termination endpoint of the signal propagation path.

Accordingly, when the transmitter element 12 and the receiver element 14 are comprised of a plurality of transmitter and receiver modules, a plurality of signal propagation paths are established through the optical transmission system 10. It should be expressly noted that the starting endpoints of those signal propagation paths do not need to physically reside at the same location. On the contrary, in most applications, the beginning endpoints will be located at different places to accommodate traffic from sources that are physically remote from one another. As a consequence, the transmitter element 12 will have under this specific example of implementation, a distributed structure.

The same comments can also be made in connection with the receiver element 14. The receiver modules 14a 14b do not necessarily reside at the same physical location to accommodate signal propagation path topologies characterized by termination endpoints physically remote from one another.

In operation, a transmitter module, say transmitter module 12a receives at an input an-electrical signal to be transported. This electrical signal is processed by the transmitter module 12a and transmitted as an optical signal over the optical medium 16 up to the companion receiver module 14a. In this specification, the optical signal that travels over the signal propagation path established between the transmitter module 12a and the companion receiver module 14a is referred to as a "sub-signal". The set of sub-signals between the transmitter element 12 and the receiver element 14 are globally designated as the "optical transport signal".

At the receiver module 14a, the sub-signal is processed to generate an electrical signal that is released by the receiver module 14a.

The sub-signals of the optical transport signal have a nonuniform bandwidth. In other words, at least one of the sub-signals has a bandwidth that is different from the bandwidth of another sub-signal in the optical transport signal.

Figure 2:
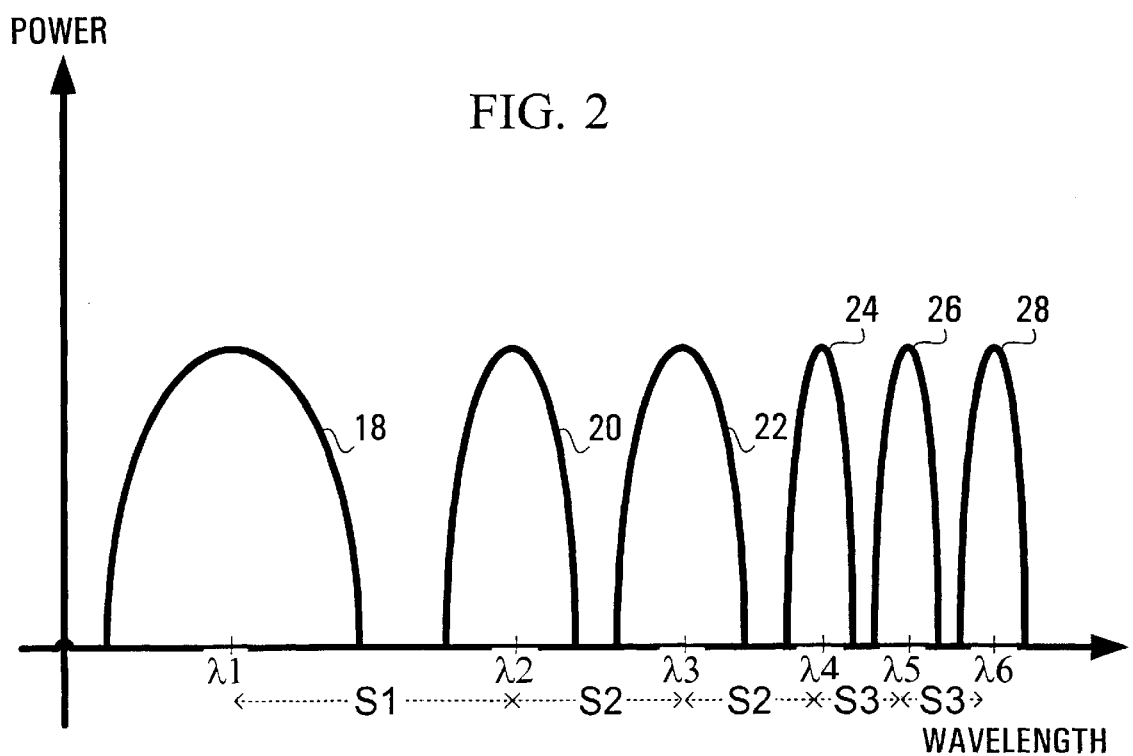
FIG. 2 is a graph that illustrates the optical energy distribution in a transport signal having a plurality of sub-signals, where the bandwidth of the sub-signals is not uniform.

FIG. 2 is an example of the energy distribution in a transport signal that has six sub-signals. For reference, the sub-signals are designated 18, 20, 22, 24, 26 and 28. The sub-signals 18–28 have wavelengths $\lambda 1$ to $\lambda 6$, respectively. It will be appreciated from the drawing that sub-signal 18 has the largest bandwidth. Sub-signals 20 and 22 each have identical bandwidths each of which are less than the bandwidth of sub-signal 18. Finally, the sub-signals 24, 26 and 28 each have identical bandwidths which are less than the bandwidth of sub-signals 20 and 22.

The arrangement where the sub-signals have a nonuniform bandwidth, such as shown at FIG. 2, creates a transport mechanism where the transport resources can be better tailored to the actual need. For example, when an electrical signal of a comparatively low data rate needs to be transported, one of the sub-signals 24, 26 or 28 may be selected for the transport instead of the sub-signal 18. This provides a better utilization of the optical frequency domain of the transport signal.

It is also possible to select the wavelengths $\lambda 1$–$\lambda 6$ such that the inter sub-signal wavelength spacing varies in dependence of the bandwidth of the sub-signals. For example, in the case of two adjacent (here "adjacent" refers to relative positions of the sub-signals in the optical frequency domain) sub-signals, say sub-signal 18 and sub-signal 20, the wavelength spacing S1 could be relatively large in light of the fact that the sub-signal 18 is a high bandwidth sub-signal. In contrast, the wavelength spacing S3 between the sub-signals 24, 26 and 28 could be significantly less than S1. The absolute values of S1, S2 and S3 are not critical to the present invention. The choice for a particular S1, S2 and S3 value is essentially a practical matter and depends largely upon the hardware/software used in the processing of the transport signal in the transport system 10. However, it can be generally stated that when two pairs of adjacent sub-signals exist in the transport signal, the wavelength spacing between the first sub-signals pair will be larger than the wavelength spacing between the second sub-signals pair if either one of the sub-signals of the first pair of sub-signals has a bandwidth that is larger than the bandwidth of each sub-signal of the second pair of sub-signals. For example, in FIG. 2, sub-signals 18 and 20 define a first pair of sub-signals while the sub-signals 20 and 22 define a second pair of sub-signals. The wavelength spacing S1 is larger than S2 because the bandwidth of the sub-signal 18 is larger than the bandwidth of any one of the sub-signals 20 and 22. The same analysis can also be made with other sub-signal pairs, such as the pair of sub-signals 18 and 20 and the pair of sub-signals 26 and 28.

Several adaptations of the optical transport system 10 can be made to better suit different applications without departing from the spirit of the invention. As mentioned earlier, the number of the transmitter and receiver modules in the transmitter and receiver elements 12 and 14, respectively, can be varied. For example, to generate the six sub-signals shown in FIG. 2, six transmitter units and six companion receiver units are used.

For applications where the electrical signals to be transported have a data rate (bandwidth) and propagation paths that are fixed, in other words they do not change, the wavelengths and bandwidths of the respective transmitter and receiver units can be selected and fixed such as to provide a good utilization of the optical spectrum. Objectively, this approach may not be optimal when the data rate or propagation paths through the optical transmission system of one or more of the data signals changes. In this instance, a more dynamic approach may provide better overall performance.

Figure 3:
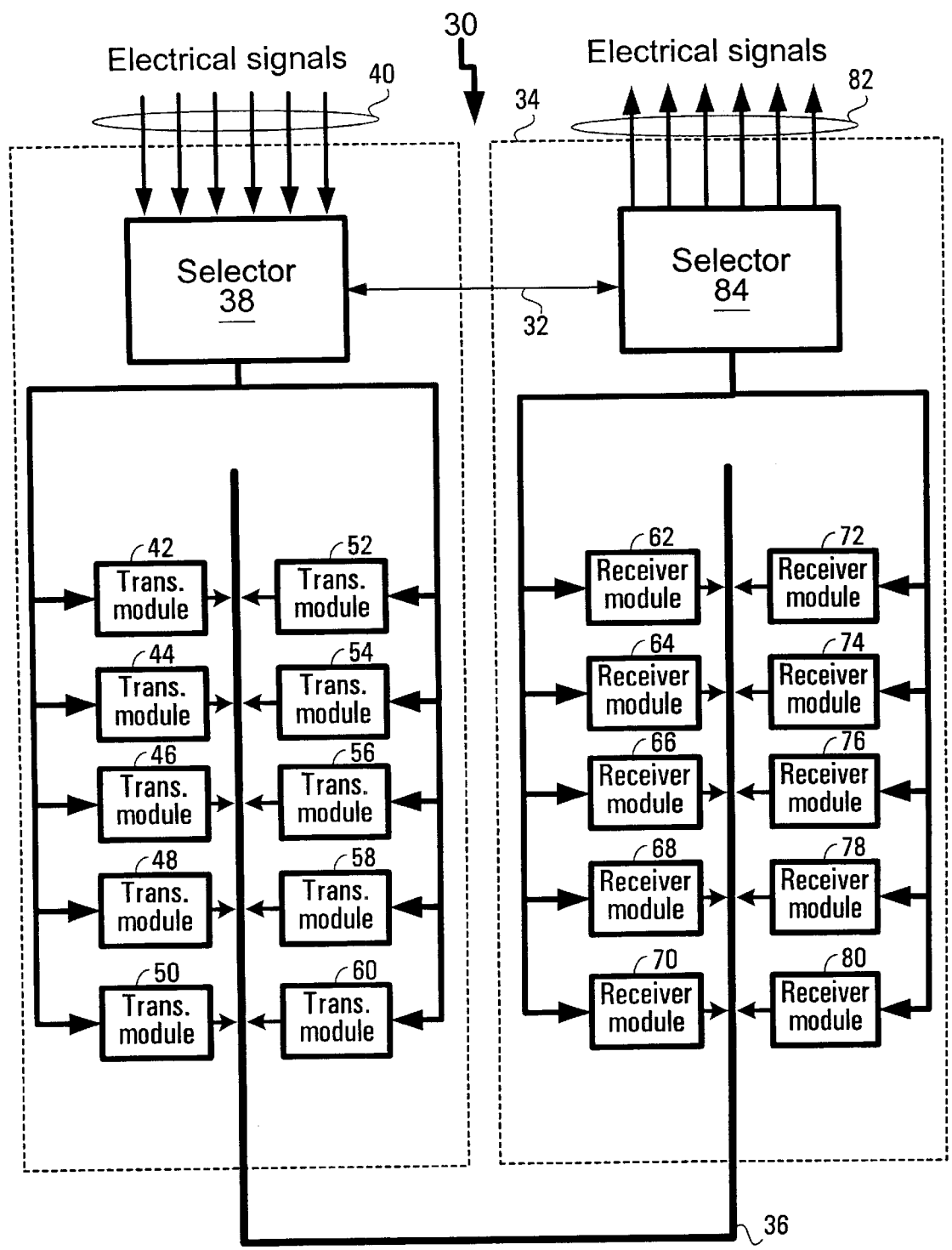
FIG. 3 is a block diagram of an optical transmission system according to a variant.

An example of such alternative embodiment is shown in FIG. 3. The optical transmission system 30 has a transmitter element 32, a receiver element 34 and an optical transmission medium 36. The transmission element 32 includes a selector 38 that receives a collection of electrical signals 14 to be transported over the optical transmission medium 36. The signals in the collection of electrical signals 14 have different data rates (bandwidths). The selector 38 connects with a bank of transmitter modules 42, 44, 46, 48, 50, 52, 54, 56, 58 and 60. Each transmitter module 42–60 is tuned to a particular wavelength and has a known bandwidth. On the basis of the data rates of the signals 40, the selector 38 activates the transmitter modules in the bank of transmitter modules 42–60 that are most suitable for the current transport requirements. One possible strategy is to use a single transmitter module for each electrical signal and select the transmitter module to best match the data rate of each electrical signal. Other selection strategies are possible without departing from the spirit of the invention.

In one possible form of implementation, the selector 38 is largely software implemented where a software program executing on a processor receives information on the data rates of the electrical signals (this information can be assessed directly by the selector by sensing the individual electrical signals or it can be conveyed from an external source if such information is externally available) and determines what combination of transmitter modules 42–60 will best suit the current electrical signals combination.

Such software implementation can be designed to be executed on any suitable computer platform.

Alternatively, the selector 38 can be realized only in hardware without departing from the spirit of the invention.

At the other end of the transport system 30, the receiver element 34 performs the reverse operation by extracting from the optical medium 36 the sub-signals and passing them to corresponding receiver modules 62, 64, 66, 68, 70, 72, 74, 76, 78 and 80. The receiver modules 62–80 generate electrical signals that are then released at output 82 from the optical transmission system 30. The receiver element 34 also has a selector 84 whose task is to activate the receiver modules 62–80 that are tuned to the sub-signals present in the optical signal transmission medium 36. The selector 84 performs this operation either by analyzing the optical transport signal in the optical signal transmission medium 36 or through signaling information received from the selector 38 of the transmitter element 40. The arrow 32 symbolizes a pathway for this signaling information. This signaling information can also travel over the optical transmission medium 36.

In a non-limiting alternative example of implementation, each transmitter module 42–60 is functionally associated to a companion receiver module in the set of companion receiver modules 62–80 through a respective signal propagation path. In this example, the selector 84 for activating one or more desired receiver mudules 62–80 can be omitted.

A possible refinement of the embodiment shown in FIG. 3 is to provide the selector 38 with multiplexing capabilities that can combine one or more electrical signals for transport over a common sub-signal. Any suitable multiplexing mechanism can be used, time division multiplexing (TDM) being one possibility. Similarly, a demultiplexer is present in the selector 84 to demultiplex the electrical signals.

The structure of the transmitter modules and receiver modules described in the embodiments shown in FIGS. 1 and 3 are not described in detail because those elements are generally known to those skilled in the art. In one form of implementation, a transmitter module can comprise an electrical energy to optical energy transducer (such transducer may include a laser for example). Similarly, a receiver module may comprise an optical energy to electrical energy transducer.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. An optical medium containing a transport signal comprising a plurality of sub-signals, each sub-signal being characterized by a known wavelength of light and a known bandwidth, the bandwidth of the sub-signals being non-uniform.

2. An optical medium as defined in claim 1, wherein the plurality of sub-signals are spaced in the optical frequency domain from one another in a non-uniform manner.

3. An optical medium as defined in claim 2, wherein a spacing in the optical frequency domain between two adjacent sub-signals is related to a bandwidth of at least one of the two signals.

4. An optical medium as defined in claim 2, wherein said transport signal includes:
   a) a first pair of adjacent sub-signals spaced in the optical frequency domain by a value A;
   b) a second pair of adjacent sub-signals signals spaced in the optical frequency domain by a value B;
   c) at least one of the sub-signals in the first pair of sub-signals having a bandwidth larger than a bandwidth of each of the sub-signals in the second pair of sub-signals; and
   d) A>B.

5. A transmitter element comprising:
   a) an input for receiving a plurality of electrical signals containing data;
   b) an output;
   c) a plurality of transmitter units in communication with said input and with said output, said transmitter units being operative to load the data in a transport signal and release the transport signal from said output, said transport signal comprising a plurality of sub-signals, each sub-signal being characterized by a known wavelength of light and a known bandwidth, the bandwidth of the sub-signals being non-uniform.

6. A transmitter element as defined in claim 5, wherein the plurality of sub-signals are spaced in the optical frequency domain from one another in a non-uniform manner.

7. A transmitter element as defined in claim 6, wherein spacing in the optical frequency domain between two adjacent sub-signals is related to a bandwidth of at least one of the two signals.

8. A transmitter element as defined in claim 7, wherein said transport signal includes:
   a) a first pair of adjacent sub-signals spaced in the optical frequency domain by a value A;
   b) a second pair of adjacent sub-signals signals spaced in the optical frequency domain by a value B;
   c) at least one of the sub-signals in the first pair of sub-signals having a bandwidth larger than a bandwidth of each of the sub-signals in the second pair of sub-signals; and
   d) A>B.

9. A transmitter element as defined in claim 5, wherein each electrical signal from said plurality of electrical signals is associated to a respective transmitter unit from said plurality of transmitter units.

10. A transmitter element as defined in claim 5, said transmitter element further comprising a selector module coupled to said input and to said plurality of transmitter units, said selector module being operative to direct a certain electrical signal from said plurality of electrical signals to a certain transmitter unit of said plurality of transmitter units on the basis of a characteristic of the certain electrical signal.

11. A transmitter element as defined in claim 10, wherein the characteristic in the data rate associated to the certain electrical signal.

12. A transmitter element as defined in claim 10, wherein said selector module comprises a processor and a memory unit storing a program element, the program element when executing on the processor being operative to direct the certain electrical signal to the certain transmitter unit on the basis of a characteristic of the certain electrical signal.

13. A receiver element comprising:
   a) an input for receiving an optical transport signal containing data, the transport signal comprising a plurality of sub-signals, each sub-signal being characterized by a known wavelength of light and a known bandwidth, the bandwidth of the sub-signals being non-uniform;
   b) an output;
   c) a plurality of receiver units in communication with said input and with said output, said receiver units being operative to generate on a basis of the transport signal at said output a plurality of electrical signals containing the data.

14. A receiver element as defined in claim 13, wherein the plurality of sub-signals are spaced in the optical frequency domain from one another in a non-uniform manner.

15. A receiver element as defined in claim 14, wherein spacing in the optical frequency domain between two adjacent sub-signals is related to a bandwidth of at least one of the two signals.

16. A receiver element as defined in claim 15, wherein said transport signal includes:
   a) a first pair of adjacent sub-signals spaced in the optical frequency domain by a value A;
   b) a second pair of adjacent sub-signals signals spaced in the optical frequency domain by a value B;
   c) at least one of the sub-signals in the first pair of sub-signals having a bandwidth larger than a bandwidth of each of the sub-signals in the second pair of sub-signals; and
   d) A>B.

17. A method for transporting data, comprising:
   a) loading the data in a transport signal having a plurality of sub-signals, each sub-signal being characterized by a known wavelength of light and a known bandwidth, the bandwidth of the sub-signals being non-uniform;
   b) causing propagation of said transport signal in an optical medium.

18. A method as defined in claim 17, wherein the plurality of sub-signals are spaced in the optical frequency domain from one another in a non-uniform manner.

19. A method as defined in claim 18, wherein a spacing in the optical frequency domain between two adjacent sub-signals is related to a bandwidth of at least one of the two signals.

20. A method as defined in claim 19, wherein said transport signal includes:
   a) a first pair of adjacent sub-signals spaced in the optical frequency domain by a value A;
   b) a second pair of adjacent sub-signals signals spaced in the optical frequency domain by a value B;
   c) at least one of the sub-signals in the first pair of sub-signals having a bandwidth larger than a bandwidth of each of the sub-signals in the second pair of sub-signals; and
   d) A>B.

21. A transmitter element comprising:
   a) means for receiving a plurality of electrical signals containing data to be transmitted;
   b) output means;
   means for loading the data in an optical transport signal and releasing the data from said output means, the transport signal comprising a plurality of sub-signals, each sub-signal being characterized by a known wavelength of light and a known bandwidth, the bandwidth of the sub-signals being non-uniform.

22. A receiver element comprising:
   a) means for receiving an optical transport signal containing data, the transport signal comprising a plurality of sub-signals, each sub-signal being characterized by a known wavelength of light and a known bandwidth, the bandwidth of the sub-signals being non-uniform;
   b) output means;
   c) means for generating on a basis of the transport signal at said output means a plurality of electrical signals containing the data.

* * * * *